US010678757B2

(12) United States Patent
Pradeep et al.

(10) Patent No.: US 10,678,757 B2
(45) Date of Patent: Jun. 9, 2020

(54) RELIABLE GENERATION OF A UNIQUE KEY IN A DISTRIBUTED SYSTEM

(71) Applicant: salesforce.com, inc., San Francisco, CA (US)

(72) Inventors: Aakash Pradeep, Fremont, CA (US); Abhishek Bangalore Sreenivasa, Hayward, CA (US); Adam Torman, Walnut Creek, CA (US); Alex Warshavsky, Walnut Creek, CA (US); Ivan Daya Weiss, Berkeley, CA (US); Samarpan Jain, Fremont, CA (US); Somesh Sasalatti, Mountain View, CA (US); Soumen Bandyopadhyay, Glen Park, CA (US); Choapet Oravivattanakul, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 388 days.

(21) Appl. No.: 15/093,920

(22) Filed: Apr. 8, 2016

(65) Prior Publication Data

US 2017/0293632 A1    Oct. 12, 2017

(51) Int. Cl.
*G06F 16/182* (2019.01)
*G06F 16/27* (2019.01)
(Continued)

(52) U.S. Cl.
CPC ............ *G06F 16/183* (2019.01); *G06F 16/13* (2019.01); *G06F 16/252* (2019.01); *G06F 16/27* (2019.01); *G06F 16/283* (2019.01)

(58) Field of Classification Search
CPC ............ G06F 11/3476; G06F 2201/86; G06F 16/183; G06F 16/27; G06F 16/283;
(Continued)

(56) References Cited

U.S. PATENT DOCUMENTS

| 3,637,077 A | 1/1972 | Cowan |
| 5,577,188 A | 11/1996 | Zhu |

(Continued)

OTHER PUBLICATIONS

Grover, Mark; "Processing frameworks for Hadoop—How to decide which framework is best for your particular use case" dated Feb. 16, 2015; retrieved from the internet at <http://radar.oreilly.com/2015/02/processingframeworks-for-hadoop.html>; 10 pages.

(Continued)

*Primary Examiner* — David T. Brooks
*Assistant Examiner* — Berhanu Mitiku
(74) *Attorney, Agent, or Firm* — Morris & Kamlay LLP

(57) ABSTRACT

A database system may determine that a database is unavailable to generate an identifier for an event or that events may not be written to the database. As a result, the database system may write the event to a low-latency, supplementary file system. The database system may determine that the database is available at a later time, and read the event from the supplementary file system, store the event in a memory component, and then delete the event from the supplementary file system. The database system may then access the database to generate an identifier for the event, write the event to the database, and then delete the event from the memory component.

19 Claims, 7 Drawing Sheets

(51) Int. Cl.
*G06F 16/28* (2019.01)
*G06F 16/13* (2019.01)
*G06F 16/25* (2019.01)

(58) Field of Classification Search
CPC ..... G06F 16/13; G06F 16/252; H04L 41/069; H04L 67/1004
See application file for complete search history.

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | Mineiro et al. |
| 7,062,502 B1 | 6/2006 | Kesler et al. |
| 7,069,231 B1 | 6/2006 | Cinarkaya et al. |
| 7,069,497 B1 | 6/2006 | Desai et al. |
| 7,100,111 B2 | 8/2006 | Mineiro et al. |
| 7,181,758 B1 | 2/2007 | Chan et al. |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | Mineiro et al. |
| 7,401,094 B1 | 7/2008 | Kesler et al. |
| 7,406,501 B2 | 7/2008 | Szeto et al. |
| 7,412,455 B2 | 8/2008 | Dillon et al. |
| 7,454,509 B2 | 11/2008 | Veilleux et al. |
| 7,508,789 B2 | 3/2009 | Chan et al. |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Doliov et al. |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | D'Angelo et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson et al. |
| 8,015,495 B2 | 9/2011 | Achacoso et al. |
| 8,032,297 B2 | 10/2011 | Jakobson et al. |
| 8,073,850 B1 | 12/2011 | Steven et al. |
| 8,082,301 B2 | 12/2011 | Ahlgren et al. |
| 8,095,413 B1 | 1/2012 | Beaven et al. |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,185,356 B2 * | 5/2012 | Mukaigawa ............ H04Q 9/00 702/112 |
| 8,209,308 B2 | 6/2012 | Rueben et al. |
| 8,209,333 B2 | 6/2012 | Hubbard et al. |
| 8,275,836 B2 | 9/2012 | Douglas et al. |
| 8,457,545 B2 | 6/2013 | Chan |
| 8,484,111 B2 | 7/2013 | Sturgeon et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins et al. |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |

(56) References Cited

U.S. PATENT DOCUMENTS

| | | |
|---|---|---|
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon et al. |
| 2009/0063414 A1 | 3/2009 | White et al. |
| 2009/0063415 A1 | 3/2009 | Chatfield et al. |
| 2009/0100342 A1 | 4/2009 | Jakobson et al. |
| 2009/0177744 A1 | 7/2009 | Marlow et al. |
| 2011/0060939 A1 | 3/2011 | Singhal et al. |
| 2011/0247051 A1 | 10/2011 | Bulumulla et al. |
| 2011/0320409 A1* | 12/2011 | Iyengar .............. G06F 16/2379 707/674 |
| 2012/0042218 A1 | 2/2012 | Cinarkaya et al. |
| 2012/0218958 A1 | 8/2012 | Rangaiah et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson et al. |
| 2013/0218949 A1 | 8/2013 | Jakobson et al. |
| 2013/0218966 A1 | 8/2013 | Jakobson et al. |
| 2013/0247216 A1 | 9/2013 | Cinarkaya et al. |
| 2014/0359537 A1 | 12/2014 | Jackobson et al. |
| 2015/0215389 A1 | 7/2015 | Spencer |
| 2017/0220596 A1* | 8/2017 | Smith .................. G06F 16/178 |
| 2017/0279901 A1* | 9/2017 | Carricarte .......... H04L 67/1095 |

OTHER PUBLICATIONS

Anonymous: "Multi Tenant Architecture", Salesforce.com, Mar. 31, 2016 (Mar. 31, 2016), pp. 1-23, XP055373747, Retreived from the internet: URL:https://developer.salesforce.com/.

Extended European Search Report dated Jun. 9, 2017 as received in Application No. 17164448.7.

European Office Action issued in EP Patent Application No. 17164448. 7, dated Aug. 8, 2018, 9 pages.

* cited by examiner

RELIABLE GENERATION OF A UNIQUE KEY IN A DISTRIBUTED SYSTEM

BACKGROUND

Certain databases, such as non-relational databases that run on top of distributed file systems, may be rendered unavailable from time to time because of processes such as data splitting, merging, or compaction, or emergency events that disrupt network activity or database components. These databases may rely on unique identifiers to identify stored events. When such databases are unavailable, there may be no capability for generating identifiers for events that are received to be written to the databases. Events awaiting identifiers may be stored in memory; however there may be a high volume of write activity that exceeds memory capacity. As a result, events may be dropped from memory before identifiers for the events can be generated.

BRIEF DESCRIPTION OF THE DRAWINGS

The accompanying drawings, which are included to provide a further understanding of the disclosure, are incorporated in and constitute a part of this specification. The drawings also illustrate implementations of the disclosure and together with the detailed description serve to explain the principles of implementations of the disclosure. No attempt is made to show structural details in more detail than may be necessary for a fundamental understanding of the disclosure and various ways in which it may be practiced.

DETAILED DESCRIPTION

Figure 1:
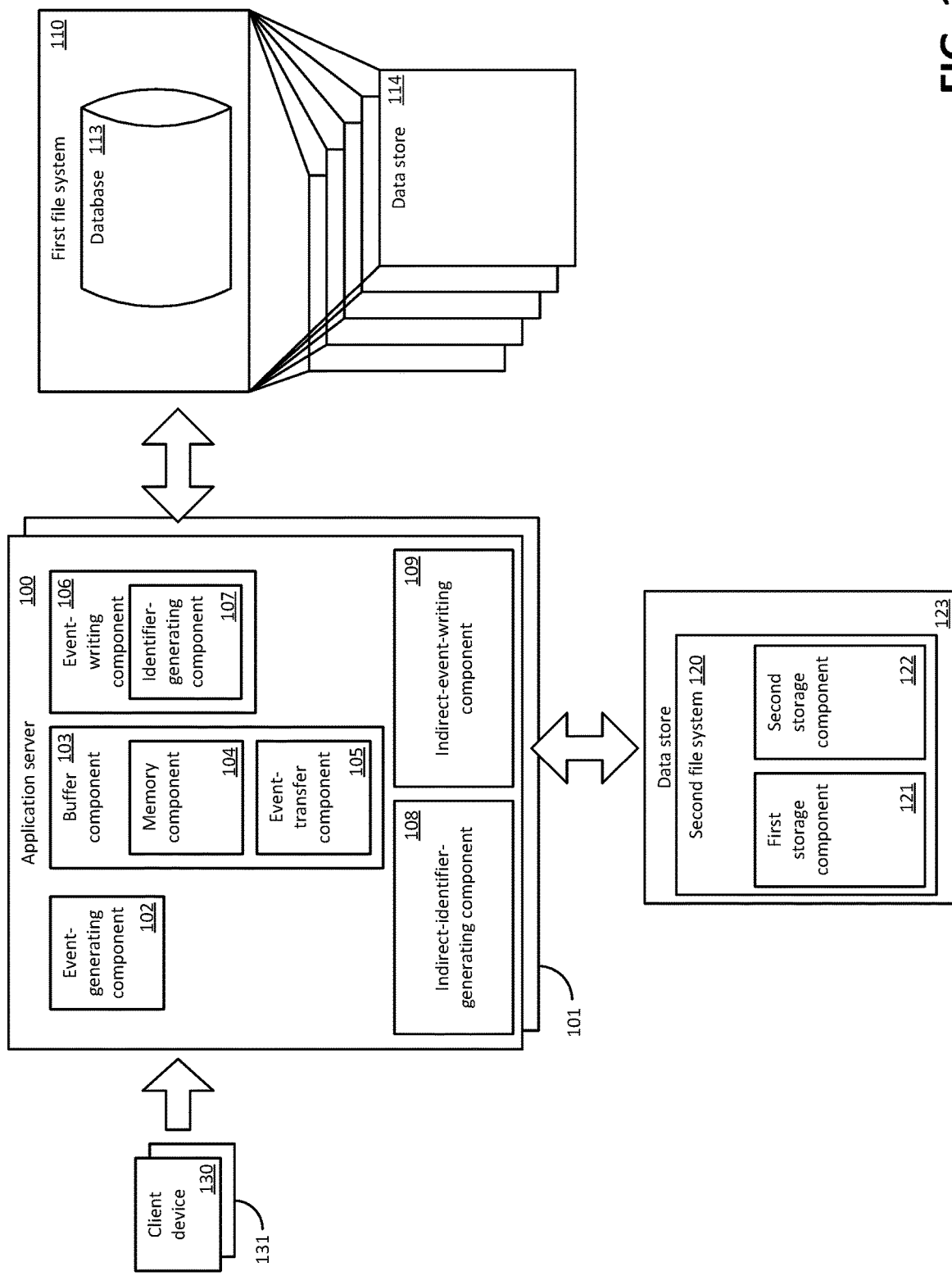
FIG. 1 shows an example system diagram of a component environment according to an implementation of the disclosure.

To address issues in distributed database systems such as dropping events before identifiers may be generated, techniques may be provided for reliably generating identifiers for events temporarily stored in low-latency, supplementary data stores. For example, in an implementation of this disclosure, a database system may include a server hosting an application that may receive application data from a client device that is interacting with the application. For instance, an emergency response organization may maintain an application server that provides an application to residents and businesses in a large metropolitan region. The residents and businesses may interact with the application via mobile devices and other computer systems to send data to report emergency circumstances. The application server may generate an event to be written to a database based on the received data. For example, a large earthquake may have hit the region. An event representing a fire at an office complex may be generated based on received data. The received data may include data from three different employees calling the emergency responders via mobile devices running the application, and smoke detector and sprinkler system sensors providing data indicating their sensor measurements to an office computer system running the application. The event may also include the time the data was received, location of the devices that provided the data, or other relevant emergency information. It may be beneficial to store such events in the database because analytical procedures may be performed on data from the database to optimize fire response resources. During emergency events such as earthquakes in densely populated cities, fire response resources may be especially scarce due to the high demand of emergency responders.

A component of the database system, such as an identifier-generating component, may execute on the application server and may attempt to access an event storage database to generate an identifier that uniquely identifies the fire event. This identifier may then be assigned to the event and the event may be written to the distributed data store on which the database is implemented. However, because of the earthquake, the network connection to the data store may be significantly reduced. Moreover, due to the high population of the region, the application server may be inundated with a high volume of emergency data and thus generate a high volume of events to be written to the database. Thus the database may be unresponsive for a certain period of time, for example, at least 16 milliseconds. As a result, after being unresponsive for 16 milliseconds, the database may be deemed unavailable.

A supplementary data store may maintain a low-latency, high throughput, supplementary file system on a data store in communication with the application server. In response to determining the database is unavailable, a batch of events including the fire event may be written as an event file to the supplementary file system. An indirect-identifier-generating component may periodically determine the next event or event file to receive an identifier and/or be written to the database. For example, the indirect-identifier-generating component may periodically access a metadata table stored at the database that maintains an ordered log of events that have not successfully received identifiers or been written to the database. The indirect-identifier-generating component may retrieve attributes from the attribute metadata table that may be used to determine the next event or event file in the supplementary file system to receive an identifier or set of identifiers.

The indirect-identifier-generating component may, based on the retrieved attributes, read the next event file determined to receive identifiers from the supplementary file system and write the event file to a memory component of the application server. The next event file may include the fire event. Once all events from the event file are written to the memory component, the event file may be deleted from the supplementary file system.

It may be beneficial to delete the event file because it may prevent the possibility generating multiple identifiers for the same event, as in the case where the indirect-identifier-generating component is interrupted or halted after it completes processing the event file but before deleting the file from the supplementary file system. The indirect-identifier-generating component may then access the database, generate a unique identifier, and assign the identifier to each event in the event file, including the fire event.

In some circumstances, after assigning the identifier, the database may once again become unavailable. For example, in some implementations, the database system may determine the database is not responding for a certain period of time and as a result determine the database is unavailable, as described above. As a consequence, a batch of events including the fire event with its assigned identifier may be written as a new file to the supplementary file system. An indirect-event-writing component of the database system may periodically attempt to access the database to write events. The indirect-event-writing component may read the fire event from the supplementary file system, and once the database is available, write the event to the database. Once all the events in the new file are written to the database, the indirect-event-writing component may delete the new file from the memory component of the application server and/or the supplementary file system.

Component Environment

Implementations of this disclosure may be executed in a variety of component environments. For example, FIG. 1 shows an example system diagram of a component environment according to an implementation the disclosure. A database system may include application servers 100, 101 in communication with a database 113 implemented with first file system 110 on data store 114, and a second file system 120 implemented on data store 123. In some implementations, the database system may include only application server 100 and components and procedures executing thereon, and, in other implementations, the database system may include additional or other components and procedures, such as those with respect to data store 114 and data store 123. The application server 100 may be in communication with a client devices 130, 131. In some embodiments, data store 123 may be separate and distinct from data store 114 and application server 100. For example, data store 123 may be located in Boulder, Colo., data store 114 may be located in Los Angeles, Calif., and application server 100 may be located in Sacramento, Calif.

Application servers 100, 101 and client devices 130, 131 may be connected through a series of one or more networks such as network 800 described below with respect to FIG. 8, or a combination of such networks. In other embodiments, application servers 100, 101 and client devices 130, 131 may have a direct connection to each of the other devices in the network. As shown, multiple application servers, 100, 101 are connected to multiple client devices 130, 131. In some embodiments, multiple application servers, such as application servers 101, 101 may be connected together over one or more networks and share resources and task allocation, for example, as in a cloud computing service. In other embodiments there may be any number of servers or client devices, and the component environment of FIG. 1 may include additional and/or different components. Implementations of the logical relationships and procedures disclosed herein may be realized in any alternative component configurations suitable for the purposes of this disclosure.

In some embodiments application servers 100, 101 may be multi-tenant application servers designed to provide access to applications for multiple distinct sets of users on one or more client devices, such as client devices 130, 131. A tenant, may be an organization, such as emergency responders or a private business, or portion of an organization, such as the fire fighters or the sales department. More generally, a tenant may be any group of users who share access with specific privileges to a software instance such as the software instance of an application provided by application server 100 or a database. In other embodiments, application servers 100, 101 may be single-tenant application servers designed to service a single set of users on one or more client devices, such as client devices 130, 131. Application servers 100, 101 may provide resources that are made available, continuously or as needed, to client devices 130, 131, such as data processing, data storage, data retrieval, application-specific functionality, and so forth.

Application servers 100, 101 may include any computing devices suitable for the purposes of this disclosure, such as computing device 700 described below with respect to FIG. 7. Application servers 100, 101 may include various elements of hardware and software that may be shared by one or more tenants. For example, application server 100 may include an application platform that provides a hardware and/or software infrastructure for the creation, management, and execution of an application by a tenant of the database system or a non-tenant application developer.

Client devices 130, 131 may include any computing devices suitable for interacting with applications provided by application servers 100, 101, such as computing device 700 described below with respect to FIG. 7. Client devices 130, 131 may communicate with application servers 100, 101 to access resources, such as an application hosted on application server 100 and provided to the client devices 130, 131. For example a tenant may access an application provided by application server 100 through a web browser or other application communicating in accordance with a hypertext transfer protocol and executing on client device 130.

Application servers 100, 101 may include various components. For example, according to an embodiment of the disclosure, application server 100 may include an event-generating component 102; a buffer component 103, which may include a memory component 104 and an event-transfer component 105; event-writing component 106, which may include identifier-generating component 107; indirect-identifier-generating component 108; and indirect-event-writing component 109. However, some or all of these components may be included and execute, in part or in whole, on other components of the database system, such as data store 114 or data store 123.

The event generating component 102 may be a procedure specific to a particular application executing on application server 100 or it may be a service shared across multiple applications executing on application server 102. Generally, the event generating component 102 may receive data from client devices 130, 131 and generate events in accordance with conditions, policies, or other data-response procedures specified by the application being provided by application server 100. The events may then eventually be written to a database, such as database 113, for later access and analytics.

An event may be a sequence of one or more values or elements, such as a tuple, which represents something that happened. Events may be standardized across multiple applications executing on an application server, such as application server 100, or customized for a specific application. For example many different applications may have an event that represents a user logging in to the application on a client device; however a sales analysis application may not have an event representing the detection of a fire. An event can be immutable, and may be timestamped or otherwise assigned a sequence indicator as it is generated. An event can refer to data that characterizes an action at a client device, such as client device 130, that causes an interaction with an application being provided by an application server, such as application server 100. Events may be monitored, logged, and recorded for storage and/or retrieval for analysis in near-real time or at a later time.

In an implementation such as described above, the application server 100 may provide an application for emergency responders to client devices associated with an office complex. Application server 100 may receive data from client devices such as data from smart phones of three employees of the office complex indicating a fire, data from a building safety system of the office complex indicating that four smoke alarms are detecting smoke and fifteen fire suppression devices are emitting fire suppression chemicals, and data indicating the location and time of the data collection. Based on this received application data, the event generating component 102 of application server 100 may generate an event that represents a fire has been detected at the office complex.

In another example, events related to user actions may be logged and later analyzed to characterize user behavior. For instance, user actions such as the use of applications, windows opened, system commands executed, check boxes clicked, text entered and/or edited, network locations visited, and so forth may be captured for later analysis.

When an application executing on application server 100 generates an event, it may store the event in memory. In some implementations, events may be received by buffer component 103. Buffer component 103 may include various components such as memory component 104 and event-transfer component 105. As shown in FIG. 1, buffer component 103 may be implemented on application server 100; however some or all components of buffer component 103 may be implemented on other components of the database system, such as data store 114 or data store 123.

In some implementations, buffer component 103 may include a buffer service that stores, retrieves, and forwards objects, such as events. The buffer service may be designed to provide a very low latency application program interface (API) to write events to data store 114. For example, the buffer service may write events to database 113 in 0.08 microseconds. The buffer service may keep events in memory until the number of events reaches a configured event number limit and/or for a configured time, for example 10 seconds.

In some implementations, the buffer service can include an event transfer component 105, which may include a capture service that receives events generated by an application executing on application server 100. Buffer component 103 may contain memory component 104, which may include a buffer service that may store captured events in an in-memory bounded buffer. The event transfer component 105 may also include a buffer flush regulator that may manage the transfer of events from the in-memory bounded buffer. The Memory component 104 may include any combination of hardware and software suitable for the purposes of the disclosure, such as for example memory 770 described below with respect to FIG. 7.

The in-memory bounded buffer of memory component 104 may support a concurrently writable API, which stores events in memory component 104 of application server 100. The in-memory bounded buffer may include multiple single-threaded segments, and the capture service of event transfer component 105 may be able write events to or read events from each segment in parallel. When a number of events stored in the in-memory bounded buffer reaches a predefined limit, the in-memory bounded buffer may provide a notification to the buffer flush regulator of the event-transfer component 105.

In some implementations, when the buffer flush regulator receives the notification, it may cause the application server 100 to read a set of associated events, such as an event file, from the in-memory bounded buffer and provide the event file to event-writing component 106 of the data store 114 to be written to database 113. A set of items, such as events or a file, may include a single item, multiple items, or no items. Event-writing component 106 may include an executor service that employs a dynamically sized thread pool of execution threads to read the segments of the bounded buffer in parallel to allow the events to be written directly to the data store. Events can be consumed in parallel fashion to allow for high throughput.

The executor service of event-writing component 106 may receive the file and write the events in the file directly to database 113, that is write the events to the database without storing the events in intermediary memory or other storage. In some implementations, the executor service may request a file from the in-memory bounded buffer to be written to database 113. Although, FIG. 1 shows event-writing component 106 implemented on application server 100, other implementations are contemplated by this disclosure, such as where event-writing component 106 and identifier-generating component 107 execute on data store 114.

In some implementations, before an event in an event file may be written to database 113, an identifier may be generated and assigned to the event. For example, in addition to writing events, the executor service of event-writing component 106 may also include identifier-generating component 107. The identifier-generating component may include execution threads that access other components of application server 100 or database 113 to generate and assign identifiers to events. These execution threads may be included in dynamic thread pool of event-writing component 106.

An identifier may enable location, sorting, and retrieval of an event from database 113 because the identifier may be unique amongst all identifiers assigned to events in database 113. A key may be an identifier for an event, and may be generated in any suitable form, such as, for example, an alphanumeric sequence. Portions of the key may provide information about the event. For example, a portion of the key may be a tenant identifier, which may uniquely identify the tenant to whom an event belongs. Other portions of the key may be values that identify, for example, a table number, row, column, or index value of database 113.

In some implementations, an identifier may also include sequence indicator, which may be a number or set of ordered symbols received from a strictly increasing or decreasing counter implemented on application server 100. Each time the counter generates a sequence indicator, the value of the counter may increment such that no identical sequence indicators are generated and each sequence indicator corresponds to the order in which it is generated. A sequence indicator may be a time or approximate the time when an identifier including the sequence indicator is generated and/or assigned to an event. For example as sequence indicator may be a time stamp received from a clock implemented on application server 100. The rate at which the counter increments may correspond to the clock, or values of the counter may be periodically synchronized to values of the clock. In some implementations the database system may access the clock or counter of application server 100 or data store 114 when generating assigning identifiers to events.

In some implementations, the generation of identifiers requires access to database 113. For example, the identifier to be generated may specify particular rows, columns, indexes, or other values of a table associated with a tenant's database 113. Thus, the applicable table of database 113 may need to be analyzed to determine which particular row, column, index, other value, or range of such values, are available within the table to receive an event. As a result, when the database system generates an identifier for an event, identifier-generating component 107 may first access database 113 to determine the needed values for the identifier.

If database 113 is not available, such as during periodic maintenance or when there is network interruption due to an emergency event, it may be prohibitively slow or impossible to generate identifiers. Database 113 may be unavailable for up to an hour or longer, but even a few minutes of unavailability may create significant memory overflow risks in database systems with a high volume of write activity. In implementations where all identifier-generator functionality resides on data store 114, it may not be possible to obtain sequence indicators such as clock or counter values because such data store resources would not be accessible.

In circumstances where events cannot be written to database 113 because identifiers cannot be generated or because database 113 is not available, memory component 104 of the application server 100 may reach its storage capacity. For example, in circumstances, such as the emergency earthquake event described above, there may be an excessive number of events generated by an emergency response application executing on application server 100. The level of event generation may drastically exceed normal operational levels of the database system such that additional storage capacity is required.

In such circumstances, the database system may determine that an identifier has not been generated for an event, and as a result may write the event instead to a supplementary data store. For example, identifier-generating component 107 may fail to generate an identifier for a preconfigured period of time. For instance the fire event referenced above may fail to have an identifier generated for a preconfigured period of time because database 113 is unavailable due to network interruptions caused by the earthquake. As a result, identifier-generating component 107 may send an indicator to event-transport component 105 that represents that the identifier cannot be generated. In response to receiving this indicator, event-transport component 105 may write the event without an identifier to the first storage component 121 of second file system 120 in data store 123.

In an example implementation, event-transfer component 105 may employ a set of execution threads that correspond to each of the threads of the identifier-generating component 107. A thread of the identifier-generating component 107 may send an indicator to the corresponding thread of the event-transfer component 105 indicating that an identifier was not generated for an event. The event may have been read from a particular segment of the bounded buffer of memory component 104. The thread of the event-transfer component 105 may read the particular event from the segment. A batch of events, including the particular event may be read by the event-transfer component 105 and written as an event file to the first storage component 121 of second file system 120.

A supplementary file system, such as second file system 120 implemented on data store 120 may function to relieve memory overflow of application server 100. The supplementary file system may not be backed by a large transactional data store such as data store 113. Rather file system 120 may operate as a separate file storage system that can store unstructured data as files, such as files that contain arbitrary and possibly unrelated data with little or no ordering, or organizing structure required. For example second file system 120 may be a blobstore that stores binary large object (BLOB) values or blobstore values. As a result, in contrast to database 113 implemented on data store 114, second file system 120 may provide much higher throughput and much lower latency. In some embodiments, the latency of writing to second file system 120 may be less than the latency of writing to the first file system, and the latency of reading from second file system 120 may be less than the latency of reading from memory component 104. Further second file system 120 may be available to write regardless of whether the database 113 is in read-only mode or is otherwise unavailable, which increases reliability of the database system. For example second file system 120 may not provide a read-only mode, so events may be written to second file system 120 at any time.

Second file system 120 may include first storage component 121 and second storage component 122, and either component may include directories or other organizations of data. First storage component 121 may be a directory that stores exclusively events without identifiers. For example, the fire event described above may be written to the first storage component because it was not assigned an identifier. Events with identifiers may be written to second file system 120. In such implementations, the events with identifiers may also be written to the second storage component 122. Second storage component 122 may be a directory of second file system 120 that stores exclusively events with identifiers.

Figure 7:
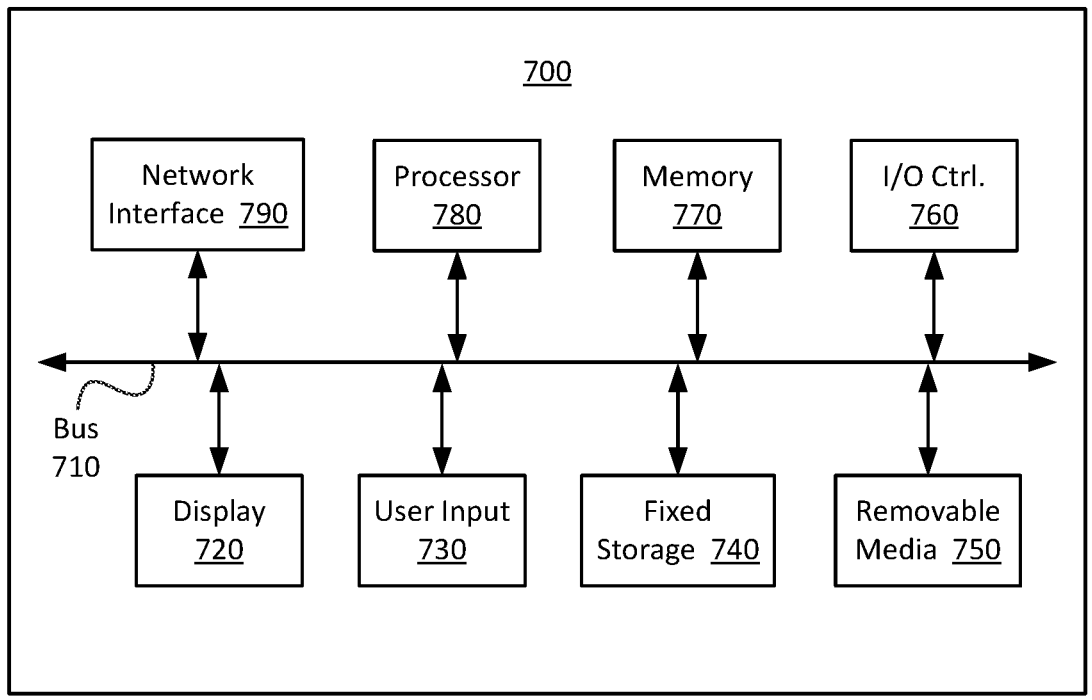
FIG. 7. shows an example computing device according to an implementation of the disclosure.

The physical storage of data store 123 may include any type of physical storage suitable for the purposes of this disclosure, such as any suitable combination of memory 770 and fixed storage 740 as described with respect to FIG. 7. For example, the physical storage of data store 123 may include an access control server or a cursor server. Data store 123 may be co-located with one or more of application servers 100, 101, such as in the same cluster of application servers 100, 101. Data store 123 may include a single physical machine or multiple physical machines, including multiple redundant physical machines, where one machine may replicate the data stored on the other machine.

In implementations of this disclosure, second file system 120 may store an event or event file for a configurable amount of time, after which the database system may delete the event or event file to allow for additional events or event files to be stored. In some implementations this amount of time may be arbitrarily configured. In other implementations, the amount of time may be configured, for example, based on the rate of expected unavailability of database 113, as well as the rate of expected overflow of application server 100. For example, the amount of time may be configured to be 1 hour, 12 hours, 1 day, 7 days, 2 weeks, or any other selected amount of time suitable for the purposes of this disclosure.

Events stored in second file system 120 may ultimately have identifiers generated and assigned and be written to database 113 on data store 114. For example, application server 100 may include an indirect-identifier-generating component 108. Indirect-identifier-generating component 108 may include a service that periodically sends requests to database 113 to determine whether it is available. If indirect-identifier-generating component 108 receives an indicator from database 113, it may determine that database 113 is available. Indirect-identifier-generating component 108 may request and receive an identifier for an event and assign that identifier to the event. In some implementations, event writing functionality of indirect-identifier-generating component 108 may then attempt to write the event along with its accompanying identifier to database 113. In other implementations, other components of the database system, such as indirect-event-writing component 109 may read the event and attempt to write the event to database 113.

In some implementations, events generated at application server 100 may have had identifiers successfully generated by identifier generating component 107. However, the executor service of event-writing component 106 may be unsuccessful when it attempts to write the event to database 113. In such circumstances, event-transfer component 105 may write the event to second storage component 122 of second file system 120. In such implementations indirect-event-writing component 109 may read the event from second storage component 122 and attempt to write the event to database 113.

If the database system either fails to generate an identifier for an event stored in second file system 120 or fails to write the event to database 113, then the respective processes or the threads executing such functionality may periodically repeat until database 113 is available and the process or thread is completed. For example, indirect-identifier-generating component 108 may include a daemon process that repeatedly reads the first storage component 121 of second file system 120 and attempts to generate and assign an identifier to events stored therein. Similarly, indirect-event-writing component 109 may include a daemon process that repeatedly reads the second storage component 122 of second file system 120 and attempts to write events having identifiers to database 113. Further discussion of indirect-identifier-generating component 108 and indirect-event-writing component 109 is included in later portions of this disclosure.

Database 113 may be implemented on a single data store or distributed data store, such as data store 114, having multiple servers and/or server clusters. The physical storage of data store 114 may include any type of physical storage suitable for the purposes of this disclosure, such as any suitable combination of memory 770 and fixed storage 740 as described with respect to FIG. 7. In one embodiment, database 113 may be a structured arrangement of data that persists in metadata and data. For example database 113 may be an open source, multitenant, non-relational, distributed database such as Apache HBase™, Bigtable™, MongoDB™, or similar NoSQL database. In other embodiments, other databases may be implemented, such as Postgres, Mysql Server, or Oracle 12c databases. First file system 110 may be a distributed file system such as Apache Hadoop™ distributed file system, Amazon™ simple storage system, or Windows™ Azure Storage Blob file system, or other file systems such as Oracle™ cluster file system or Red Hat™ global file system. Database 113 may be a database specifically designed to integrate with first file system 110, such as where an Apache HBase™ database is implemented with a Hadoop™ distributed file system.

The database system may store events associated with various combinations of tenants, databases, file systems, and data stores. For example, a set of events associated with a set of tenants may be stored on a set of databases associated with the set of tenants. Each of the set of databases may be integrated with a single file system 110 on data store 114, and data store 114 may be distributed. In other implementations, a set of events associated with a set of tenants may be stored on a single database integrated with a single file system 110 on data store 114, and data store 114 may be distributed. In other implementations, data store 114 may not be distributed, for example, where storage devices of the data store 114 are attached to a common processor. Embodiments of this disclosure may include any of the above, as well as any other combination of tenants, databases, file systems, and data stores suitable for the purposes of this disclosure.

Reliable Identifier Generation

Figure 2:
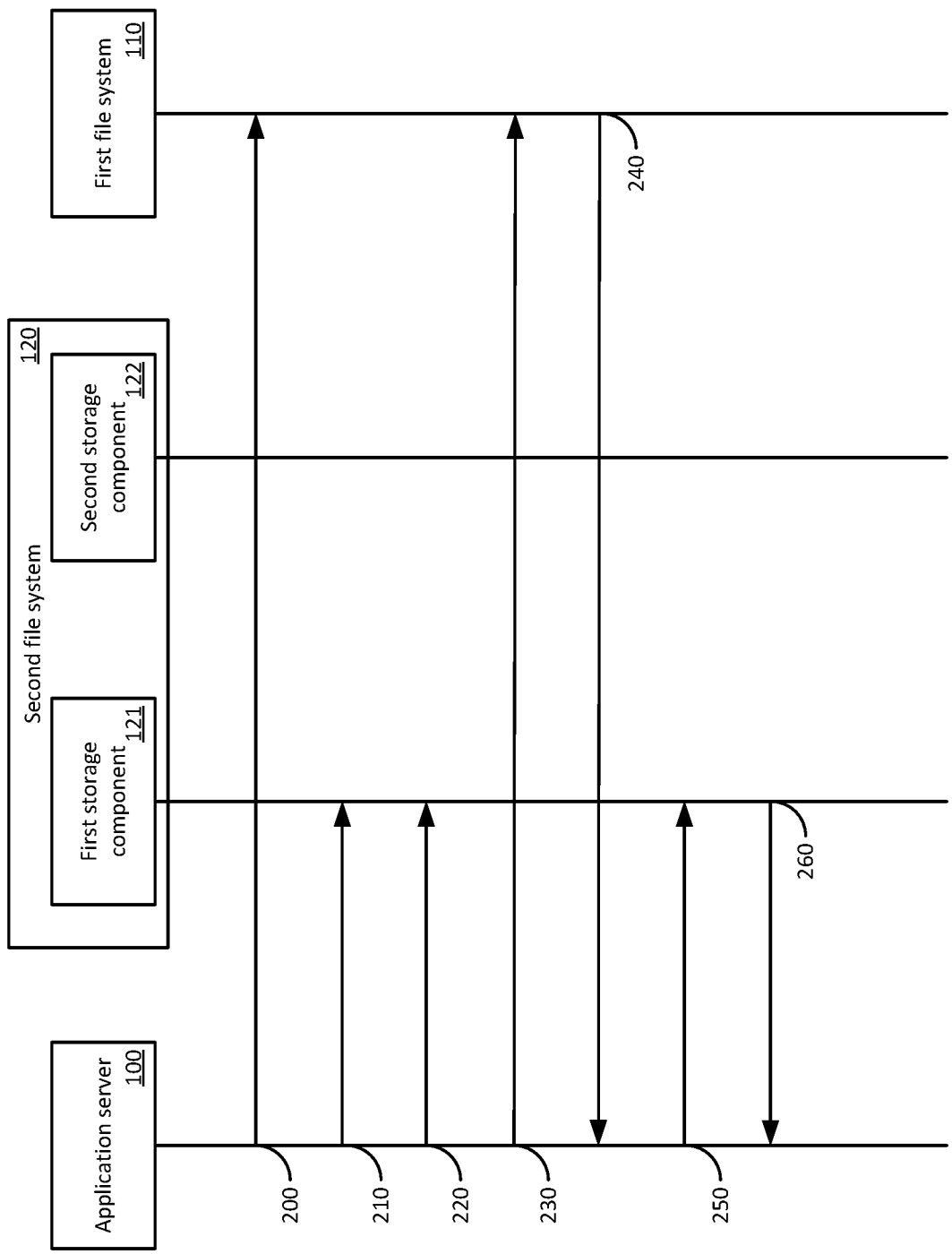
FIG. 2 shows an example sequence diagram for identifier generation according to an implementation of the disclosure.

Generating identifiers for events stored in a supplementary file system, such as second file system 120 may require the transmission and receipt of various messages amongst components of the database system. For example, FIG. 2 shows a sequence diagram for identifier generation according to an implementation of the disclosure. At 200, a component of the database system, such as identifier-generating component 107 of event-writing component 106, may attempt to access database 113 of first file system 110 to retrieve and assign an identifier to a particular event. The attempt may fail, for example the database 113 may be unavailable and the request may time out. At 210, event-transfer component 105 may write a batch of events, including the particular event, as a particular event file to first storage component 121 of second file system 120.

When the particular event file is being stored to first storage component 121, the database system may generate one or more attributes that allow retrieval of the particular event file. For example, attributes may include various types of metadata such as: a cluster name that uniquely identifies a collection of instances that are grouped as a cluster of application servers, an instance name that uniquely identifies a collection of application servers grouped as an instance, an application server name of a particular application server, a group name that uniquely identifies a group of files that were generated during a particular time window, a file name of the particular file, a job started date that specifies when the particular file was created, a number of events that specifies a number of events for this particular event file, a last updated time that indicates when the particular file was last updated, a number of retry attempts that specifies how many times the database system has attempted to process the particular file, a job type that indicates whether the file is associated with regular storage operations or backup operations, and a status that indicates either running or completed. Attributes can also include other fields such as file size information regarding the file size of the particular file, a time-to-live values, and so forth.

After the particular event file is written to second file system 120, at 220 a component of the database system, such as event-transfer component 105, may write attributes that are associated with each event in the particular event file to a metadata table, which may be stored at database 113. Storage of the attribute metadata table at database 113 may be consistent with the data and metadata persistence requirements of database 113. Although the determination that database 113 was unavailable may have resulted in the storage of the event file in second file system 120, at a later time, database 113 may become available and attributes such as the above may be written to the attribute metadata table at database 113. Such attributes may be used by the database system to determine which files to read from second file system 120. For example, the filename associated with the oldest job started date, along with the relevant application server name may be used to query second file system 120 and retrieve a particular file.

The database system may periodically check database 113 to see if it is available to receive requests from or otherwise provide access to various processes and execution threads of components of the database system. For example, at 230, indirect-identifier-generating component 108 may send to database 113 a request to read a metadata table of attributes to determine the next event or event file for which identifiers may be generated and assigned. The metadata table may be accessed and particular attributes may be returned that include attributes associated with the particular event file.

In addition the request may include accessing an arrangement of values associated with particular rows, columns, indexes, other values of a table associated with a particular tenant, or a range of such values of database 113. The request may also retrieve a sequence indicator, such as from a clock or counter of data store 114. The data or combinations of data returned as a result of the request may include a generated identifier or set of identifiers for each event in the particular event file. In other implementations the returned data may be used by a thread or process executing on application server 100 to generate the identifier or set of identifiers.

At 240, the particular attributes and generated identifiers may be returned to a component of the database system, such as indirect-identifier-generating component 108. At 250 the indirect-identifier-generating component 108 may query the first storage component 121 for event files associated with the particular attributes. The particular event file may be returned as a result of the query at 260. Indirect-identifier-generating component 108 may then assign the generated identifiers to each event in the particular event file, including assigning a particular identifier to the particular event.

In other implementations, the database system may first use the retrieved metadata to select the particular event file from second file system 120 and write the particular event file to memory component 104 of the application server. Once the particular event file is written to the memory component, the database system may then determine whether the database system is available, and/or request identifiers for the particular event file. This procedure may also apply to other procedures set forth herein, such as those procedures discussed with respect to FIGS. 3 and 6.

Figure 3:
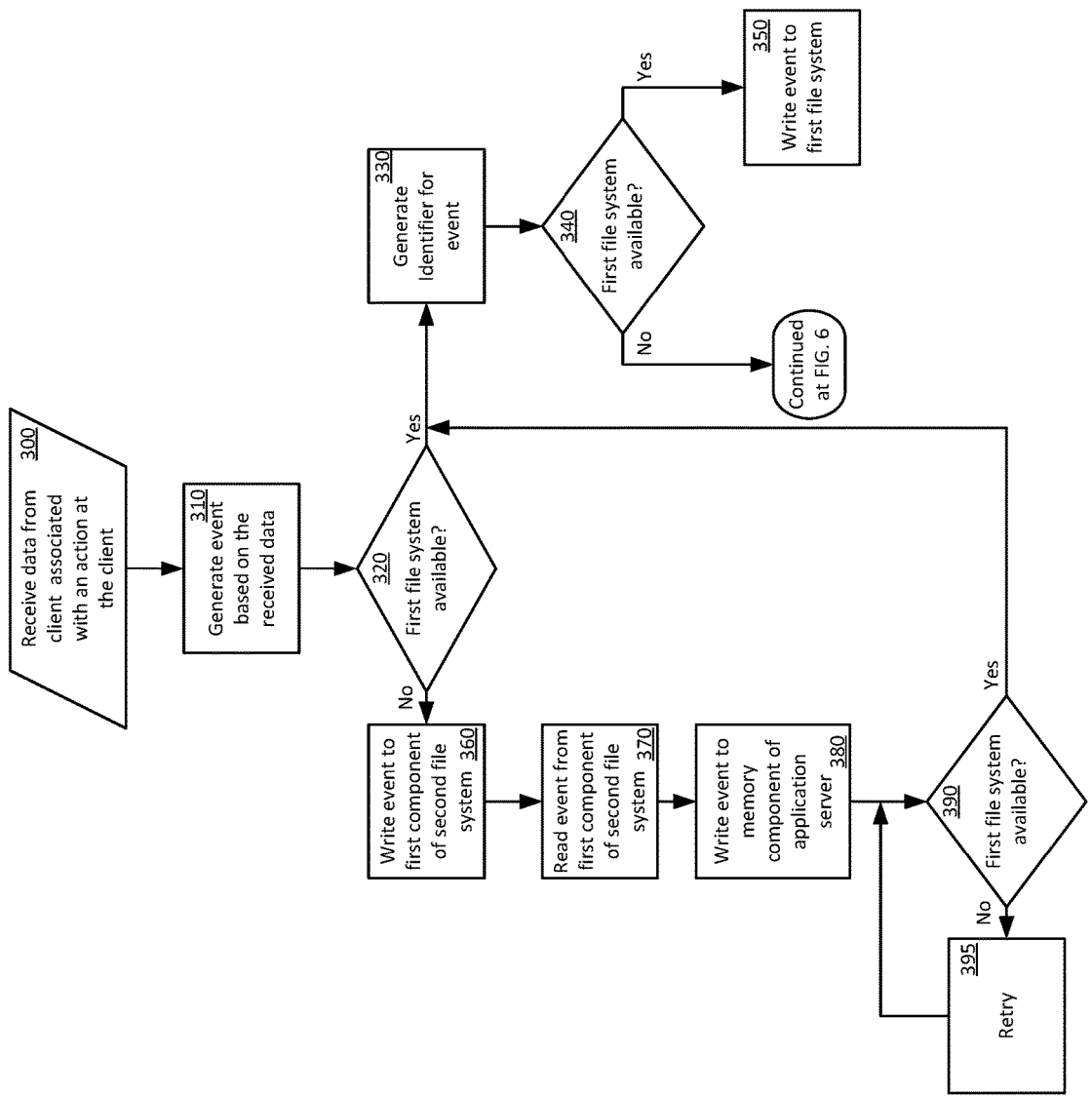
FIG. 3 shows an example procedure for identifier generation according to an implementation of the disclosure.
Figure 4:
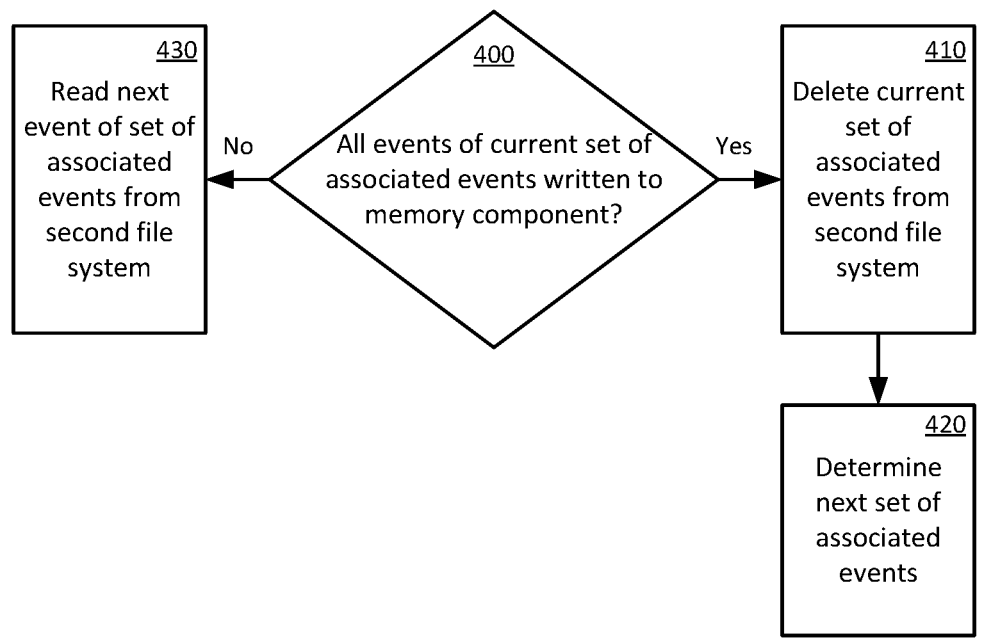
FIG. 4 shows an example procedure for deleting an event or a set of associated events according to an implementation of the disclosure.
Figure 6:
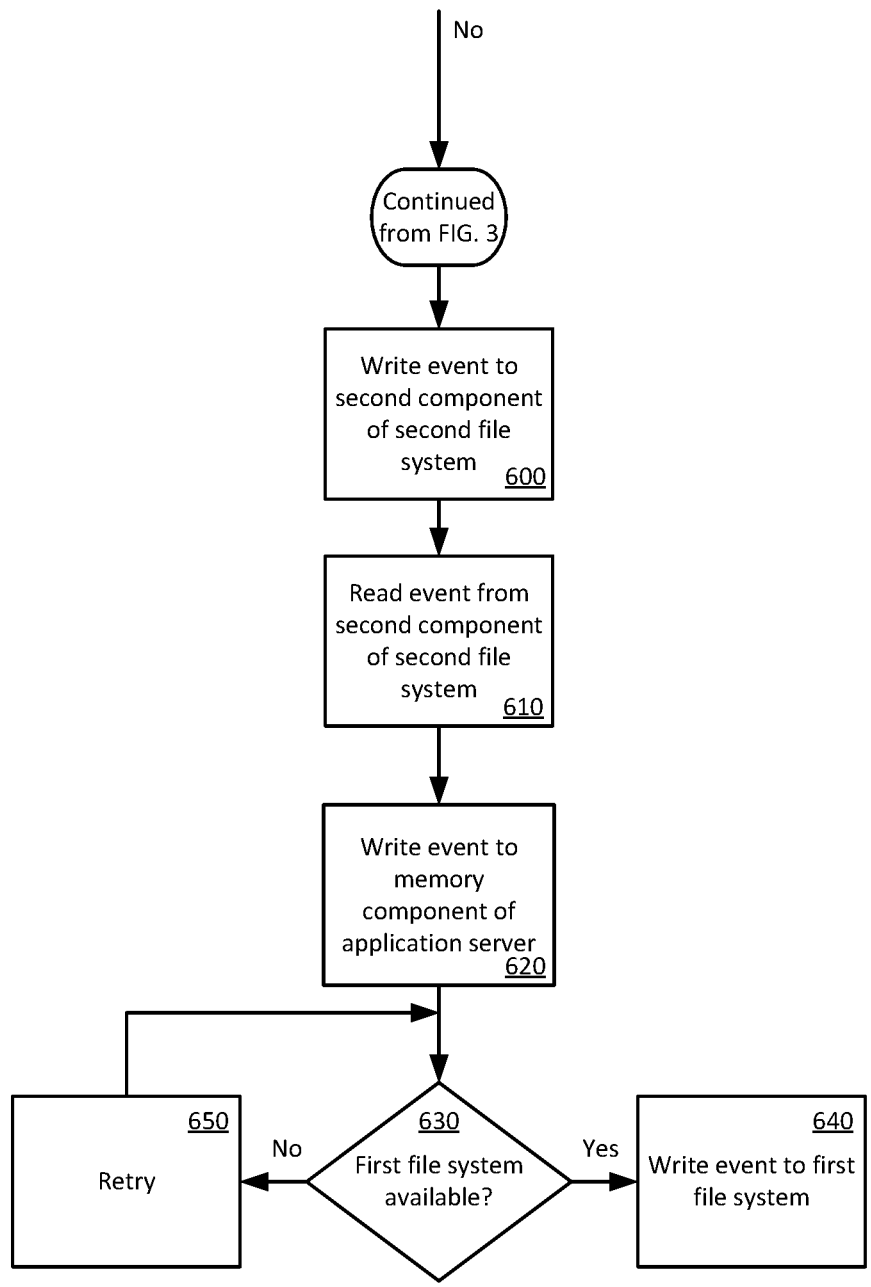
FIG. 6 shows an example procedure for writing an event to a database according to an implementation of the disclosure.

Operations performed in accordance with procedures set forth in this disclosure, such as those shown in FIGS. 3, 4, and 6, may be carried out by various components described herein. For example, a component such as indirect-identifier-generating component 108 or indirect-event-writing component 109 may include a service that includes one or more processes or one or more execution threads, such as a thread pool. The size of the thread pool may be dynamically tailored in accordance with configured optimization parameters such as demand response or load balancing. For example if a service is responding to data provided by an operation employing 4 threads, then a demand response parameter that requires matching the number of threads in the operation being responded to may cause the service to size its thread pool to 4 threads.

Implementations of this disclosure may execute a variety of procedures when generating identifiers. FIG. 3 shows an example procedure for identifier generation according to an implementation of this disclosure. As described above, the database system may receive data from a client device that is associated with an action at the client device at 300. The client may be a tenant of the database system. The data may be received, for example, at application server 100 from client device 130. The client device may be remote from the application server 100. For example, the client device may be located in Los Angeles, Calif. and the application server may be located in Ames, Iowa. The data may be associated with an action at the client device. For example, a user of the client device may perform the action of entering information into an application provided by the application server 100 that indicates a fire emergency is occurring at an office complex where the user is located. Data associated with the action may be the information entered by the user or data representing aspects of the information entered by the user, such as the type of emergency, time of the report, and location of the client device 130. The data associated with the action may be transmitted by client device 130 to application server 100. In another example, a user of the client device 130 may be a sales associate and the action may be a request entered into the client device 130 for sales history with a customer. The data associated with the action may be the sales associate's request or data representing aspects of the sales associate's request, such as the sale's associate's identity, a request for history, and an indicator of the customer.

At 310, the database system may generate a particular event based the data received from the client device. For example, application server 100 may combine data representing a fire emergency, data representing the time of the report, and data representing the location of client device 130 into an event, such as a fire event, that represents the fire at the office complex. In another example, data representing the name of the customer, data identifying the sales associate, and data representing the request for sales history may be combined into an event, such as a sales inquiry event that represents the sales associate's sales history inquiry. Such an event resulting from data from a tenant's device may be an event associated with the tenant.

At 320 the database system may determine whether an identifier has been generated for the particular event. For example, the application server may determine if the database 113 has been unavailable for threshold period of time. Database 113 may be associated with the tenant. For example, the database may be owned or controlled by the tenant and contain the tenant's data. If database 113 is available, then at 330 the database system may access the database 113 to receive a particular generated identifier and assign the particular identifier to the particular event. If the first file system is still available at 340, then at 350 the database system may write the particular event to the first file system 110. If first file system 110 is not available at 340 then the procedure may continue as set forth below.

At 320 the database system may determine that an identifier has not been generated for the particular event. For example the application server 100 may determine that a threshold period of time has expired and database 113 has not been successfully accessed to generate an identifier for the event. For instance, database 113 and file system 110 on data store 114 may be unavailable due network interruptions or data store destruction due to an earthquake in Los Angeles. In another example, database 113 may be unavailable due to operational procedures such as splitting, merging, or compaction.

In some implementations, database 113 may be determined to be unavailable when a response to a request by the database system has not been received within a threshold period of time. For example, the database system may send a request to database 113 to return a particular identifier or data representing a particular identifier for the particular record. The particular identifier or data representing a particular identifier may not be received from database 113 within a threshold period of time. At 360 in response to threshold period of time expiring, the database system may write the particular event or a particular event file containing the particular event to a secondary file system, such as second file system 120. Thus for example, the fire event or sales inquiry event may be written to second file system 120.

The particular event may be without an identifier may be written to a specific storage component of second file system 120, such as first storage component 121. First storage component 121 may be, for example, a specific directory of second file system 120. First storage component 121 may be configured to store no events other than events not having assigned identifiers. The directory may have a specific naming pattern that identifies that the directory contains only files which contain events that have not been assigned identifiers and have not been written to database 113. For instance the directory may be named EventsNoID-MMd-dyyyyHHmm. Second file system 120 may be configured to temporarily store events or event files for subsequent generation and assignment of identifiers.

Actions taken by the database system with respect to the secondary file system, such as second file system 120, may be logged or otherwise recorded in a component of the database system. For example a metadata table, such as described above with respect to FIG. 2, may be updated each time an event is being processed by the database system, or is being written to or read from second file system 120. Thus, for example, after the fire event or sales history inquiry event is written to second file system 120, a metadata table stored on data store 114 may be updated with attributes related to the writing of such events. For example data may be recorded on the metadata table including, when the database system last attempted to generate an identifier for the fire event from database 113, how many times it the database system has attempted to generate the identifier, when the database system wrote the fire event to the second file system, and what type of event it is, for example a fire emergency event.

A component of the database system may have access to an indicator of the next event or event file to receive an identifier or be written to database 113. This indicator may be derived from the attribute metadata table. For example, indirect-identifier-generating component 108 may periodically request such an indicator from the attribute metadata table. Such data may also be represented as a sequence of attributes or other indicators of the order events or event files to be addressed by the database system. In other implementations, data indicating the next event or event file to be accessed may be stored in other components of the database system, such as application server 100, or data store 114. In some implementations, the next event or event file to be written to the database 113 may be the next event or event file to receive an identifier or set of identifiers.

Continuing the example, the database system, such as via the indirect-identifier-generating component 108, may access an indicator of the next event or event file to receive an identifier. The indicator may be an attribute associated with the particular event or particular event file. The database system may periodically access second file system 120 and read the next event or next event file based on the attribute retrieved from the attribute metadata table. For example, at a time after the fire event or sales history event had been written to second file system 120, the database system via indirect-identifier-generating component 108 may access the attribute metadata table and determine that the next event to receive an identifier is the fire event or the sales history inquiry event. For instance, the indirect-identifier-generating component 108 may query the attribute metadata table to return the event stored in first component 121 of second file system 120 having the longest duration being stored in second file system 120 or the greatest number of attempts at generating an identifier for the event or writing the event to database 113. Indicators of the fire event or sales history inquiry event, such as their file names, may be returned based on such criteria.

At 370, the indirect-identifier-generating component 108 may read the particular event or particular event file from the first storage component 121 of the second file system 120. For example, the indirect-identifier-generating component 108 may query first storage component 121 for events having the filename of the fire event or the sales history inquiry event, and such events may be returned.

At 380 the particular event or event file may be written to the application server 100, such as to memory component 104. In addition, the attribute metadata table may be updated to indicate the particular event or event file had been read from second file system 120 and was being processed. Thus, for example, the fire event or sales history inquiry event may be written to memory component 104 and the attribute metadata table may be updated accordingly.

A component of the database system, such as the indirect-identifier-generating component 108, may periodically check to see if the database is available to generate an identifier or access data that may serve as a basis for generating the identifier for an event. Thus the indirect-identifier-generating component 108 may send a request to database 113 to provide an identifier or set of identifiers for the particular event or event file. In other implementations, the database system may attempt to generate an identifier for the particular event or event file in response to the particular event or event file being written to memory component 104, without first requesting confirmation that database 113 is available.

If, at 390 database 113 is available, then the identifier may be generated such as above at 330. Thus for example, an identifier may be generated for and assigned to the fire event or the sales history inquiry event. If, at 390, the database system determines an identifier has not been generated for the particular event, then at 395, the request to generate an identifier may be repeated, for example, in accordance with a scheduled retry policy. Thus, for example, if an identifier is not generated and/or assigned to the fire event or the sales history inquiry event, then the database system may repeatedly attempt to generate and assign identifiers to such events.

A variety of techniques may be employed when determining that an identifier has not been generated for an event, the event has not been written to the database, and/or that the database is not available, as is described throughout this disclosure. For example, a threshold period of time may be preconfigured. In another example, a pendency value may be equal to a period of time or may be preconfigured. If a period of time equal to the pendency value or the threshold period of time expires, then the database system may determine that the database is unavailable, that the identifier has otherwise not been generated, and/or an event has not been written to the database.

In other implementations, a pendency value may be based on one or more other threshold periods of time that may be preconfigured or dynamically generated. For example, the database system may attempt to generate a set of identifiers for an event file. A pendency value may still serve as the basis for determining whether the identifier has been generated, but the pendency value may be determined based on other values such as the number of events in the event file, a first threshold period of time that may be maximum amount of time per event, and a second threshold period of time that may be a minimum amount of time per event file. For example, the pendency value may be determined by the database system by selecting the maximum value from amongst the product of the number of events in the event file and the first threshold period of time, and the second threshold period of time. The first threshold period of time may be, for example 16 milliseconds, the number of events in the event file may be, for example, 1000, and the second threshold period of time may be 7000 milliseconds. Such a determination may be represented by the formula:

$$MAX(MaxWritePerRecordWaitTime* NumberOfEvents, MinWriteWaitTime)$$

In the above formula, MinWriteWaitTime may be the second threshold period of time, NumberOfEvents may be the number of events in the event file, MaxWritePerRecordWaitTime may be the first threshold period of time, and MAX may be a function that calculates the maximum of the two values.

In other implementations, determinations that an identifier has not been generated for an event, that the event has not been written to a database, and/or that the database is not available may be based on a number of unsuccessful attempts at generating the identifier or set of identifiers or a number of unsuccessful attempts at writing the event or event file to the database. For example, the database system may track the number of unsuccessful attempts at generating an identifier or set of identifiers and compare this number to a threshold value. If the threshold value is exceeded, then the database system may determine that the identifier and/or set of identifiers has not been generated and/or that the database is not available. In another example, the database system may track the number of unsuccessful attempts at writing an event or event file to the database and compare this number to a threshold value. If the threshold value is exceeded, then the database system may determine that the event and/or event file has not been written to the database and/or that the database is not available.

As discussed above, it may be beneficial to prevent the possibility generating multiple identifiers for the same event, such as in the case where the indirect-identifier-generating component 108 is interrupted or halted after it completes processing an event file but before deleting the event file from second file system 120. In such a circumstance, the indirect-identifier-generating component 108 may successfully generate identifiers for each event in a given event file, and after the indirect-identifier-generating component 108 recovers from being interrupted, it may erroneously address the same event file again and generate a second set of identifiers for the same event file.

FIG. 4 shows an example procedure for deleting an event or set of associated events according to an implementation of the disclosure. At 400 the database system may determine whether all events of a set of associated events such as an event file have been written to memory, such as memory component 104 of application server 100. If all the events in the event file have not been written to the memory component 104, then at 410 the next event in the event file is read from the supplementary file system at 430. For example, the event file may contain an ordered set of event such that the next event is always determined. Thus, the indirect-identifier-generating component 108 may retrieve the next event in the event file from first storage component 121 of the second file system 120 and store the retrieved event in memory component 104. If all the events in the event file have been written to the memory component 104, then at 410, the database system may delete the event file. For example indirect-identifier-generating component 108 may delete the event file from first storage component 121. At 420, the database system may retrieve the next event or set of associated events. For example, the indirect-identifier-generating component 108 may read the attribute metadata able, such described above with respect to FIG. 2, to determine the indicator of the next event file for which to generate identifiers. The database system may then begin writing each event in the event file to the memory component 104.

Reliable Event Writing

In some circumstances, a particular event may have successfully been assigned an identifier but database 113 may be determined to be unavailable when the database system attempts to write the particular event to database 113. For example, identifier-generating component 107 may successfully access database 113 to generate and assign an identifier to an event, but database 113 may become unavailable before event-writing component 106 can write the event to database 113. In such circumstances, implementations of the disclosure may write the event having the identifier to a supplementary file system, for example second storage component 122 of second file system 120 on data store 123.

Figure 5:
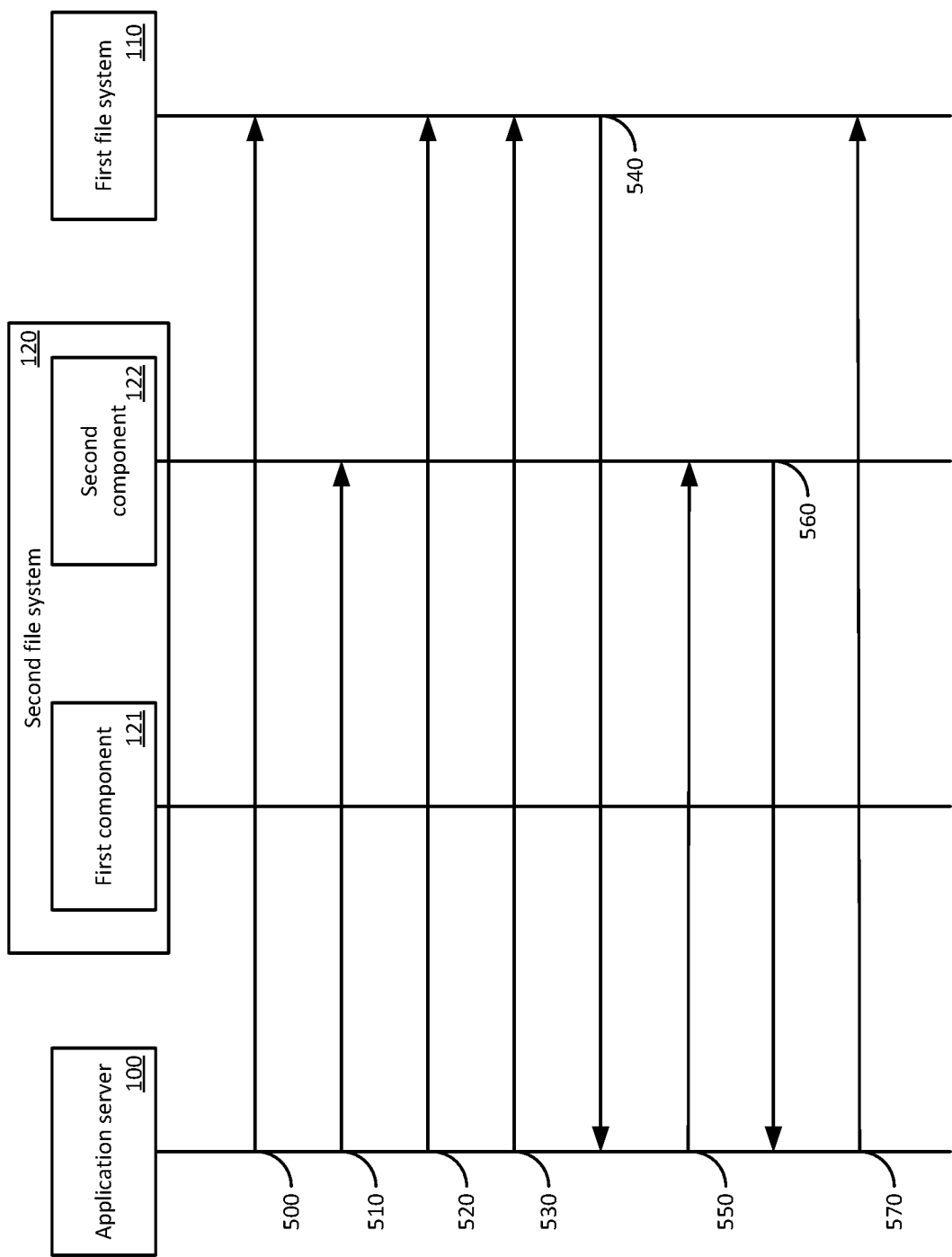
FIG. 5 shows an example sequence diagram for writing an event to a database according to an implementation of the disclosure.

Writing events from a supplementary file, such as second file system 120, to a database, such as database 113, may require the transmission and receipt of various messages amongst components of the database system. For example, FIG. 5 shows a sequence diagram for writing an event to a database according to an implementation of the disclosure. At 500, the database system may attempt to write a particular event to database 113 implemented with first file system 110 on data store 114. It may be determined that database 113 is unavailable because, for example, no confirmation of receipt of the written event may be received within a threshold period of time. As a result, at 510, the database system may write the particular event to the second file system 120. For example, the event may be written as an event file to a second storage component 122 of second file system 120. The event file may include a set of associated events, such as events with identifiers but not written to database 113. Second storage component 122 may be, for example, a specific directory of second file system 120. Second storage component 122 may be a component of the second file system configured to store no events other than events having an assigned identifier. The directory may have a specific naming pattern that identifies that the directory contains only files which contain events that have been assigned identifiers but not written to the database 113. For instance the directory may be named EventsWithID-MMd-dyyyyHHmm.

Instances of second storage component 122 and/or first storage component 121 may be periodically generated by the database system. For example, second storage component 122 and first storage component 121 may each be directories of second file system 120 and new version of each directory may be generated every ten minutes. Repeated generation of new directories may be beneficial to maintain adequate capacity in second file system 120 for receiving and tracking events from application server 100 that result from database 113 being unavailable.

After the event file is written to second file system 120, at 520 a component of the database system, such as event-transfer component 105 or indirect-event-writing component 109, may write attributes that are associated with each event in the particular event file to an attribute metadata table, which may be stored at database 113 on data store 114. Storage of the attribute metadata table at database 113 may be consistent with the data and metadata persistence requirements of database 113. Although the determination that database 113 was unavailable may have resulted in the storage of the particular event file in second file system 120, at a later time, database 113 may become available and attributes such as the above may be written to the attribute metadata table. Such attributes may be used by the database system to determine which files to read from second file system 120. For example, the filename associated with the oldest job started date, along with the relevant application server name may be used to query second file system 120 and retrieve a particular event file.

The database system may periodically check database 113 to see if it is available to receive or otherwise provide access to various processes and execution threads of components of the database system. For example, at 530, indirect-event-writing component 108 may send to database 113 a request to read a metadata table of attributes to determine the next event or event file to be written to database 113. The metadata table may be accessed and particular attributes may be returned that include attributes associated with the particular event file.

At 540, the particular attributes and generated identifiers may be returned to a component of the database system, such as indirect-event-writing component 109. At 550 the indirect-event-writing component 109 may query the second storage component 122 for event files associated with the particular attributes. At 560, an event, or event file including the particular event may be returned and written to memory, such as to memory component 104 of application server 100. At 570, the database system may write the particular event to database 113.

As described above with respect to FIG. 3 such as at 340, an identifier may be generated for a particular event, but the database system may determine that the particular event or a particular event file containing the particular event has not been written to database 113 implemented with first file system 110 on data store 114. For example, the database system may determine database 113 is not available. Implementations of this disclosure may execute a variety of procedures when writing an event to a database after it is assigned an identifier. FIG. 6 shows an example procedure for writing an event to a database after it is assigned an identifier according to an implementation of this disclosure. At 600, in response to determining the particular file has not been written to first file system 110, the particular event may be written to a secondary file system. For example, indirect-event-writing component 109 may write the particular event or event file contacting the particular event to the second storage component 122 of second file system 120 on data store 123. Second file system 120 may be configured to temporarily store events or event files for subsequent writing to database 113.

A component of the database system may have access to a record of the activity of second file system 120, and may update such a record. For example, indirect-event-writing component 109 may update an attribute metadata table, such as is described with respect to FIG. 1, to indicate that the particular event or event file has been written to second storage component 122. At a later time, the database system may access the attribute metadata table to determine the next event or event file to attempt to write to database 113. For example, indirect-event-writing component 109 may periodically query the attribute metadata table and return an indicator of the next event or event file to attempt to write to database 113. Such access, updating, querying, and other suitable actions with respect indicators of the next event or event file to be written to database 113 may be performed as is elsewhere described with respect to the attribute metadata table or as otherwise is suitable for the purposes of this disclosure.

The indirect-event-writing component 109 may access an indicator of the next event or event file to be written. The indicator may be an attribute associated with the particular event file. At 610, the indirect-event-writing component 109 may read the particular event file from the second storage component 122 of the second file system 120. After reading the particular event or event file from the second storage component, the attribute metadata table may be updated to indicate the particular event or particular event file had been read and is being processed by the database system. At 620 the particular event file may be written to the application server 100, such as to memory component 104.

At 630, a component of the database system, such as the indirect-event-writing component 109, may periodically check to see if the database is available. Thus the indirect-event-writing component 109 may send a request to database 113 to confirm that database 113 is available. Database 113 may send a response indicating it is available, and at 640, indirect-event-writing component 109 may write the particular event file to database 113. In some implementations, the database system may attempt to write the particular event file to database 113 periodically without first requesting confirmation that database 113 is available.

In some circumstances, the database system may determine that database 113 is not available, such not receiving confirmation on availability or that the particular event has been written within a threshold period of time. In such circumstances, the indirect-event-writing component 109 may retry writing the particular event file at 650, for example, in accordance with a scheduled retry policy.

In some circumstances database 113 may have been available the first time the database system attempted to generate an identifier for an event, but may become unavailable when the database system attempts to write the event to database 113. Implementations of this disclosure may process such events having identifiers the same as events that required multiple attempts before receiving identifiers, such as events that had been stored in second file system 120.

Aspects of implementations of this disclosure may make determinations of database unavailability and may execute retry processes. Generally, the techniques described with respect to making any specific determination of database unavailability or executing any specific retry process may be employed with respect to any other determination of database unavailability or execution of any other retry process. In addition, the attribute metadata table described herein may be updated at times and under conditions in addition to those expressed explicitly herein. For example, each time an event or event file is being read from or written to a secondary file system, such as second file system 120, the attribute metadata table may be updated, for example to indicate the current location of the event or event file, status of the event or event file, or to indicate the event or event file is being processed. In general, any procedure or process executed in a specific implementation described in this disclosure may also be executed in other implementations of this disclosure.

The database system may determine whether all events of a set of associated events such as an event file have been written to a database, such as database 113. If all the events in the event file have not been written to the database, then at the next event in the event file may be read from the memory component. For example, the event file may contain an ordered set of event such that the next event is always determined. If all the events in the event file have been written to the database 113, then database system may delete the event file. For example indirect-event-writing component 109 may delete the event file from memory component 104 and/or from second storage component 122. Furthermore, the database system may retrieve the next event or set of associated events. For example, the indirect-event-writing component 109 may read the attribute metadata able, such described above with respect to FIG. 2, to determine the indicator of the next event file to write to database 113. The database system may then begin writing each event in the next event file to database 113.

Other Components

Implementations of the disclosure may be implemented in and used with a variety of component and network architectures. FIG. 7 is an example computing device 700, suitable for implementations of the disclosure. Computing devices, such as computing device 700, may include computers, servers, mainframes, desktops, laptops, tablets, smart phones, wearable devices, and other computing devices. The computing device 700 includes a bus 710 which interconnects major components of the computing device 700, such as a central processor 780, a memory 770 (typically RAM, but which may also include ROM, flash RAM, or the like), an input/output controller 760, a user display 720, such as a display screen via a display adapter, a user input interface 730, which may include one or more controllers and associated user input devices such as a keyboard, mouse, and the like, and may be closely coupled to the I/O controller 760, fixed storage 740, such as a hard drive, flash storage, Fibre Channel network, SAN device, SCSI device, and the like, and a removable media component 750 operative to control and receive an optical disk, flash drive, and the like.

The bus 710 allows data communication between the central processor 780 and the memory 770, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computing device 700 are generally stored on and accessed via a computer-readable medium, such as a hard disk drive (e.g., fixed storage 740), an optical drive, floppy disk, or other storage medium.

The fixed storage 730 may be integral with the computing device 700 or may be separate and accessed through other interfaces. A network interface 790 may provide a direct connection to a remote server via a telephone link, to the Internet via an internet service provider (ISP), or a direct connection to a remote server via a direct network link to the Internet via a POP (point of presence) or other technique. The network interface 790 may provide such connection using wireless techniques, including digital cellular telephone connection, Cellular Digital Packet Data (CDPD) connection, digital satellite data connection or the like. For example, the network interface 790 may allow the computing device to communicate with other computing devices via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computing device such as that shown in FIG. 7 is readily known in the art and is not discussed in detail in this application. Code or instructions to implement this disclosure can be stored in computer-readable storage media such as one or more of the memory 770, fixed storage 740, removable media 750, or on a remote storage location.

Figure 8:
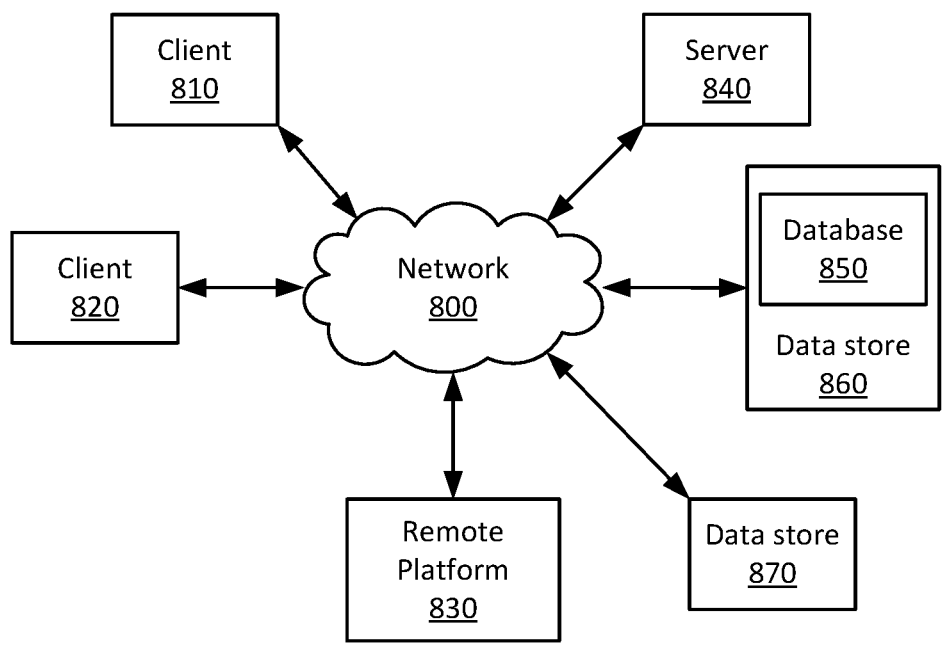
FIG. 8. shows an example network arrangement according to an implementation of the disclosure.

FIG. 8 shows an example network arrangement according to an implementation of the disclosure. One or more clients 810, 820, such as local computing devices, smart phones, tablet computing devices, and the like may connect to other devices via one or more networks 800. The network may be a local network, wide-area network, the Internet, or any other suitable communication network or networks, and may be implemented on any suitable platform including wired and/or wireless networks. The clients may communicate with one or more servers 840 and/or databases 850. The devices may be directly accessible by the clients 810, 820, or one or more other devices may provide intermediary access such as where a server 840 provides access to resources stored in a database 850. Database 850 may be implemented on a data store 860, whereas data store 870 may store data in a non-database format. A data store may be any suitable combination of hardware and software for storing structured and/or unstructured data. The clients 810, 820 also may access remote platforms 830 or services provided by remote platforms 830 such as cloud computing arrangements and services. The remote platform 830 may include one or more servers and/or databases.

More generally, various implementations of this disclosure may include or be implemented in the form of computer-implemented procedures or processes and apparatuses for practicing those processes. Implementations also may be implemented in the form of a computing device program product having instructions or computer program code containing instructions implemented in non-transitory and/or tangible media, such as floppy diskettes, CD-ROMs, hard drives, USB (universal serial bus) drives, or any other machine readable storage medium, wherein, when the computing device program code is loaded into and executed by a computing device, the computing device becomes an apparatus for practicing implementations of the disclosure.

Implementations also may be implemented in the form of computer program code, for example, whether stored in a storage medium, loaded into and/or executed by a computing device, or transmitted over some transmission medium, such as over electrical wiring or cabling, through fiber optics, or via electromagnetic radiation, wherein when the computer program code is loaded into and executed by a computing device, the computing device becomes an apparatus for practicing implementations of the disclosure. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosure in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosure.

The foregoing description, for purpose of explanation, has been described with reference to specific implementations. However, the illustrative discussions above are not intended to be exhaustive or to limit implementations of the disclosure to the precise forms disclosed. Many modifications and variations are possible in view of the above teachings. The implementations were chosen and described in order to explain the principles of implementations of the disclosure and their practical applications, to thereby enable others skilled in the art to utilize those implementations as well as various implementations with various modifications as may be suited to the particular use contemplated.

The invention claimed is:

1. A method comprising:
receiving, by an application server of a database system, first data from a client device that is remote from the application server, the first data associated with a first action at the client device;
generating, by the database system, a first event based on the first data, the first event to be written to a first file system on a distributed data store of the database system, wherein the distributed data store comprises an identifier generating component;
determining, by the database system, that an identifier has not been generated for the first event by the identifier generating component;
in response to the determination that the identifier has not been generated by the identifier generating component for the first event, writing, by the database system, the first event to a second file system of the database system that is distinct from the first file system, wherein the second file system is on a separate data store that is distinct from the distributed data store and that is distinct from the application server;
reading, by the database system, the first event from the second file system;
writing, by the database system, the first event to a memory component of the application server;
determining, by the database system, that the identifier generating component is available to generate an identifier;
in response to determining that the identifier generating component is available to generate an identifier, generating, by the identifier-generating component, a first identifier for the first event; and
assigning, by the database system, the first identifier to the first event
in response to the assigning of the first identifier to the first event, writing, by the database system, the first event to the first file system; and
in response to the writing of the first event to the first file system, deleting, by the database system, the first event from the memory component of the application server and from the second file system.

2. The method of claim 1, further comprising:
determining, by the database system, that the first event has not been written to the first file system;
in response to the determination that the first event has not been written to the first file system, writing, by the database system, the first event to the second file system;
reading, by the database system, the first event from the second file system; and
writing, by the database system, the first event to the first file system.

3. The method of claim 1, further comprising:
determining, by the database system, that the first event has not been written to the first file system;
in response to the determination that the first event has not been written to the first file system, writing, by the database system, the first event to the second file system;
reading, by the database system, the first event from the second file system; and
writing, by the database system, the first event to a non-relational database integrated with the first file system on the distributed data store.

4. The method of claim 1, further comprising:
determining, by the database system, that the first event having the first identifier has not been written to the first file system;
in response to the determination that the first event having the first identifier has not been written to the first file system, writing, by the database system, the first event having the first identifier to the second file system;
reading, by the database system, the first event having the first identifier from the second file system;
writing, by the database system, the first event having the first identifier to the first file system;
determining, by the database system, that that each of a set of associated events stored on the second file system has been written to the first file system, the set comprising the first event; and
in response to the determination that each of the set of associated events has been written to the first file system, deleting, by the database system, the set of associated events from the second file system.

5. The method of claim 1, wherein the writing of the first event to the second file system comprises writing, by the database system, the first event to a first component of the second file system configured to store no events other than events not having assigned identifiers.

6. The method of claim 1, wherein the writing of the first event to the second file system comprises writing, by the database system, the first event to a first component of the second file system configured to store no events other than events not having an assigned identifier, the method further comprising:
determining, by the database system, that the first event having the first identifier has not been written to the first file system;
in response to the determination that the first event having the first identifier has not been written to the first file system, writing, by the database system, the first event having the first identifier to a second component of the second file system configured to store no events other than events having an assigned identifier;
reading, by the database system, the first event having the first identifier from the second file system;
writing, by the database system, the first event having the first identifier to the first file system;
determining, by the database system, that that each of a set of associated events stored on the second file system has been written to the first file system, the set comprising the first event; and
in response to the determination that each of the set of associated events has been written to the first file system, deleting, by the database system, the set of associated events from the second file system.

7. The method of claim 1, further comprising:
generating, by the database system, a pendency value, wherein the determination that the first identifier has not been generated for the first event comprises:
determining, by the database system, that the first file system has been unavailable for the a period of time equal to the pendency value.

8. The method of claim 1, further comprising:
generating, by the database system, a pendency value based on:
a number of events,
a first threshold period of time, and
a second threshold period of time,
wherein the determination that the first identifier has not been generated for the first event comprises determining, by the database system, that the first file system has been unavailable for the period of time equal to the pendency value.

9. The method of claim 1, wherein the determination that the identifier has not been generated for the first event comprises determining, by the database system, that a number of attempts at generating the identifier has exceeded a threshold value.

10. The method of claim 1, further comprising:
generating, by the database system, a pendency value, wherein the determination that the first identifier has not been generated for the first event comprises determining, by the database system, that the first file system has been unavailable for a period of time equal to the pendency value;
receiving, by the application server, second data from the client device, the second data associated with a second action at the client device;
generating, by the database system, a second event based on the second data, the second event to be written to the first file system on the distributed data store of the database system;
generating, by the database system via the identifier-generating component and within a period of time that is equal to the pendency value and that is after the generation of the second event, a second identifier for the second event; and
assigning, by the database system, the second identifier to the second event.

11. The method of claim 1, wherein the first identifier is unique amongst all identifiers assigned to events stored on the first file system.

12. The method of claim 1, wherein the second file system is configured to temporarily store events for subsequent writing to the first file system.

13. The method of claim 1, wherein:
the first event is associated with a first tenant, and
a database associated with the first tenant is integrated with the first file system on the distributed data store.

14. The method of claim 1, wherein:
the first event is associated with a first tenant;
a plurality of events associated with a plurality of tenants are stored on a plurality of databases associated with the plurality of tenants;
the plurality of tenants comprises the first tenant; and
each of the plurality of database are integrated with the first file system on the distributed data store.

15. The method of claim 1, wherein a latency of writing, by the database system, a particular event to the first file system is greater than a latency of writing, by the database system, the particular event to the second file system.

16. The method of claim 1, wherein the second file system is on a separate data store that is distinct from the distributed data store.

17. The method of claim 1, wherein the second file system stores data as blobstore values.

18. A non-transitory, computer-readable medium storing instructions that, when executed by a processor, cause the processor to perform operations comprising:
receiving, by an application server of a database system, first data from a client device that is remote from the application server, the first data associated with a first action at the client device;
generating, by the database system, a first event based on the first data, the first event to be written to a first file system on a distributed data store of the database system, wherein the distributed data store comprises an identifier generating component;
determining, by the database system, that an identifier has not been generated for the first event by the identifier generating component;
in response to the determination that the identifier has not been generated by the identifier generating component for the first event, writing, by the database system, the first event to a second file system of the database system that is distinct from the first file system, wherein the second file system is on a separate data store that is distinct from the distributed data store and that is distinct from the application server;
reading, by the database system, the first event from the second file system;
writing, by the database system, the first event to a memory component of the application server;
determining, by the database system, that the identifier generating component is available to generate an identifier;
in response to determining that the identifier generating component is available to generate an identifier,
generating, by the identifier-generating component, a first identifier for the first event; and
assigning, by the database system, the first identifier to the first event
in response to the assigning of the first identifier to the first event, writing, by the database system, the first event to the first file system; and
in response to the writing of the first event to the first file system, deleting, by the database system, the first event from the memory component of the application server and from the second file system.

19. A database system comprising:
an application server in communication with a first file system, the first file system on a distributed data store;
a second file system that is distinct from the first file system;
a processor in communication with the application server, the first file system, and the second file system; and
a non-transitory, computer-readable medium in communication with the processor and storing instructions that, when executed by the processor, cause the processor to perform operations comprising:
receiving, by the application server, first data from a client device that is remote from the application server, the first data associated with a first action at the client device;
generating, by the database system, a first event based on the first data, the first event to be written to a first file system on a distributed data store of the database system, wherein the distributed data store comprises an identifier generating component;

determining, by the database system, that an identifier has not been generated for the first event by the identifier generating component;

in response to the determination that the identifier has not been generated by the identifier generating component for the first event, writing, by the database system, the first event to the second file system of the database system, wherein the second file system is on a separate data store that is distinct from the distributed data store and that is distinct from the application server;

reading, by the database system, the first event from the second file system;

writing, by the database system, the first event to a memory component of the application server;

determining, by the database system, that the identifier generating component is available to generate an identifier in response to determining that the identifier generating component is available to generate an identifier, generating, by the an identifier-generating component, a first identifier for the first event; and assigning, by the database system, the first identifier to the first event in response to the assigning of the first identifier to the first event, writing, by the database system, the first event to the first file system; and in response to the writing of the first event to the first file system, deleting, by the database system, the first event from the memory component of the application server and from the second file system.

\* \* \* \* \*